W. R. McKEEN, Jr.
TRUCK CONSTRUCTION.
APPLICATION FILED DEC. 19, 1905.

973,531.

Patented Oct. 25, 1910.

3 SHEETS—SHEET 3.

Witnesses
Chas. F. Clagett
Arthur G. Previn

W. R. McKeen Jr. Inventor
By his Attorneys
Warfield & Duell

UNITED STATES PATENT OFFICE.

WILLIAM R. McKEEN, JR., OF OMAHA, NEBRASKA, ASSIGNOR, BY MESNE ASSIGNMENTS, TO McKEEN MOTOR CAR COMPANY, OF OMAHA, NEBRASKA, A CORPORATION OF NEW JERSEY.

TRUCK CONSTRUCTION.

973,531.  Specification of Letters Patent.  Patented Oct. 25, 1910.

Application filed December 19, 1905. Serial No. 292,448.

*To all whom it may concern:*

Be it known that I, WILLIAM R. McKEEN, Jr., residing at Omaha, in the county of Douglas and State of Nebraska, have invented certain new and useful Improvements in Truck Construction, of which the following is a full, clear, and exact description, such as will enable others skilled in the art to which it appertains to make and use the same.

This invention relates to the construction of car trucks.

One of the objects thereof is to provide a rigid, durable car truck the weight of which is reduced to a minimum.

Another object is to provide a truck of the above type characterized by compact construction and easy riding qualities.

Another object is to provide a construction of the type first mentioned adapted to stand the severe strains incident to its use as a motor truck.

Other objects will be in part obvious and in part pointed out hereinafter.

The invention accordingly consists in the features of construction, combinations of elements and arrangement of parts which will be exemplified in the embodiment thereof hereinafter described, and the scope of the application of which will be indicated in the following claims.

Figure 1:
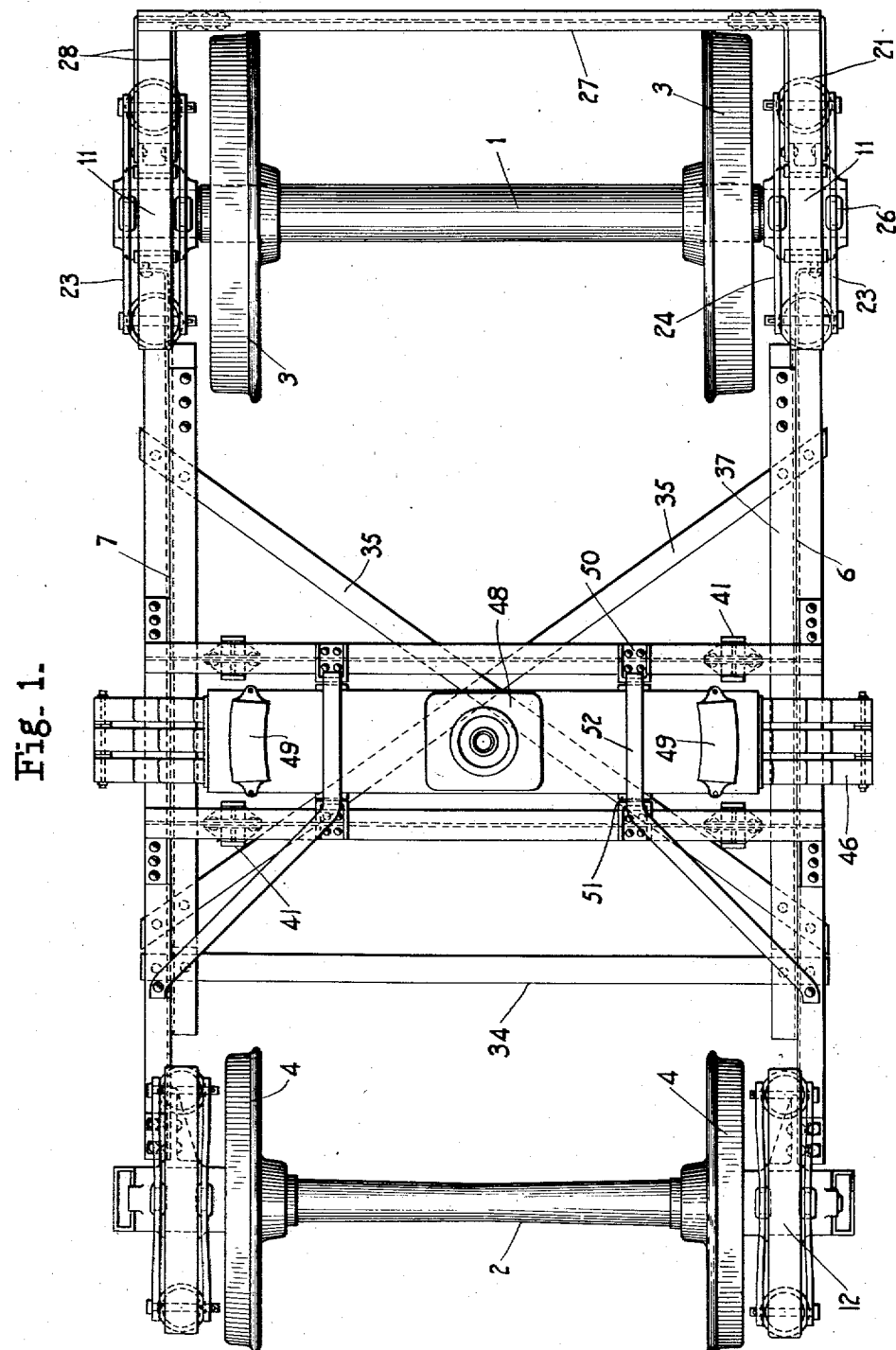
Figure 2:
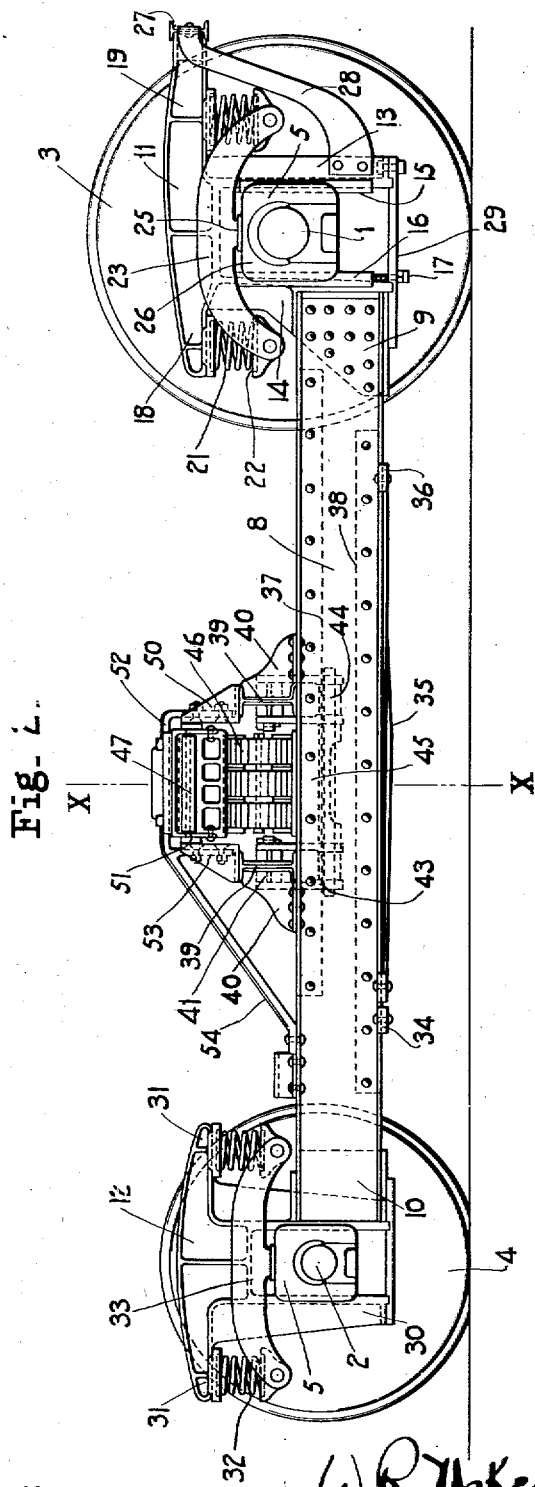
Figure 3:
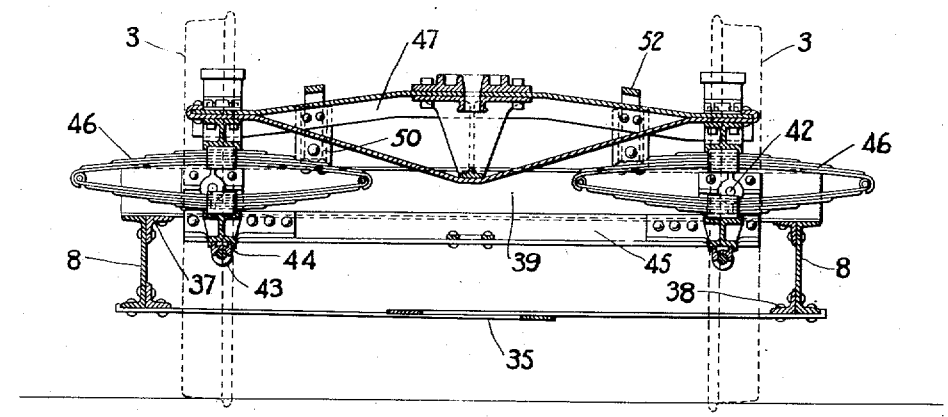
Figure 4:
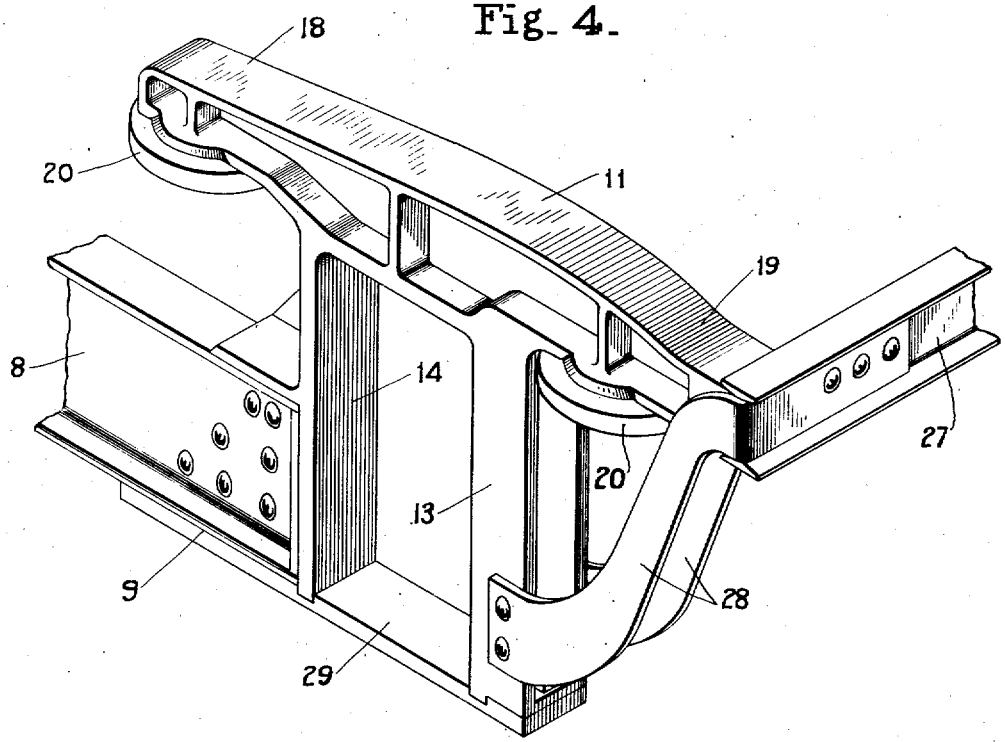

In the accompanying drawings, wherein is shown one of various possible embodiments of my invention, Figure 1 is a plan thereof. Fig. 2 is a side elevation of the same. Fig. 3 is a sectional elevation taken on the line *x—x* of Fig. 2. Fig. 4 is a detail perspective of a pedestal with associated parts.

Similar reference characters refer to similar parts throughout the several views of the drawings.

This invention will be most readily understood if the following facts are borne in mind. Car trucks in general are subjected to the most severe stresses due not only to the normal load which they are designed to bear but more particularly to the shocks and jars resulting from unevenness of the roadbed and swinging from one rail to another in rounding curves. These stresses are greatly increased in the case of a motor truck, as the entire load must be pulled through one or more pairs of wheels and the bolster of the truck and upon a sudden start or quick application of the brakes the load brought to bear upon certain parts of the truck reaches an extremely high value. Moreover, if the tractive power of the driving wheel or wheels upon one side of the truck is materially diminished, as by a mass of weeds, simultaneously with the exertion of the full tractive power upon the opposite side of the truck, there is a severe racking stress brought to bear upon the truck frame. For these reasons the tendency has been to form trucks, of the general nature of those with which this invention deals, of heavy construction, and even when so built they are not only cumbersome and expensive but are easily strained and their usefulness impaired.

The above and other defects are remedied and many positive advantages attained in constructions of the nature of that hereinafter described.

Referring now to the accompanying drawings, there is shown in Fig. 1 axles 1 and 2 having respectively mounted thereon the sets of wheels 3 and 4, the former of which are preferably of the heavier construction and greater diameter so as to adapt the same for driving purposes. Upon the axle-boxes 5 of the axles 1 and 2 are mounted side frames 6 and 7, of which, as the construction upon both sides of the truck is identical, one only will be described in detail. The "side frame," by which expression is meant the entire side portion of the truck, comprises in this case a heavy channel side-bar 8 having its flanges outwardly directed and resting at its ends within recesses or pockets 9 and 10 respectively cast within the pedestals 11 and 12. Pedestal 11 comprises the upright members or horns 13 and 14 fitting each side of the axle-box and provided with a shoe 15 and wedge 16, the latter controlled by set screw 17, resting within depressions in the sides of the box and adapted to guide the pedestal in its movement relative thereto. The upper portion of the pedestal which is preferably cast integral with the members 13 and 14 is provided with an extension 18 projecting toward the truck and an extension 19 extending in the opposite direction. Upon these extensions are formed the spring-caps 20, resting upon springs 21 seated upon spring-seats 22 which are mounted between the equalizer bars 23 and 24 resting upon the axle-box 5 at either side of the pedestal. These equalizer bars are preferably provided at their bearing point with a depending abutment 25 adapted to rest upon the box, and are prevented from lateral movement as by the lugs 26 formed thereon.

The extensions 19 upon the two sides of the truck rest within and are connected by an end bar 27 formed of iron of I cross-section and having riveted at each side of the truck to the outer and inner faces of its web the end braces 28 extending downwardly to the inner and outer sides of the pedestal-horn 13 which is connected to the horn 14 by the usual jaw-bit 29.

Pedestal 12 comprises the horns 30 fitting about the axle-box and provided with extensions 31 resting upon springs 32 supported by equalizer bars 33 upon the axle-box in a manner similar to that described with respect to the pedestal 11.

The side bars 8 are connected by a cross-member 34 passing under their lower surfaces and flanged upwardly so as to take about the outer edges thereof, and with a pair of oblique intersecting braces 35 similarly flanged about the outer edges of the side bars, as shown at 36. By reason of this construction any tendency to distort the frame, due to unequal tractive power of the driving wheels, is practically done away with as the side bars are so rigidly tied together as to form a unitary frame having a high degree of stiffness without materially increasing the weight of the truck. The side bars are braced against any tendency to lateral distortion, such as might be brought to bear thereon by the cross-members immediately above described, by angle-bars 37 and 38 riveted to the inner surfaces of the webs thereof so as to form side bars of substantially I cross-section throughout the parts subject to bending stresses, without the necessity for increasing the weight by such construction at the ends of the bars where the bending stresses are much less.

Upon the side bars 8 are mounted the transoms 39 bridged across the same and held in position as by the brackets 40. Transoms 39 are preferably I beams and are each provided with a pair of registering annular bosses 41 adjacent each end thereof through which passes a bolt 42 supporting the swing-hangers 43. The lower ends of the pairs of hangers upon each end of the two transoms are connected as by a heavy pin 44 which supports a spring-plank 45 having mounted thereon, through the elliptic springs 46, a bolster 47 provided with the customary center-plate and side bearings 48 and 49.

By reason of the construction immediately above described, it will be seen that the weight of the car passes through the bolster 47 and elliptic springs 46 to the spring-plank 45 from which it is transmitted to the transoms 39 by a connection which, while permitting free swinging movement and utilizing the full resiliency of the springs, does not tend to distort the transoms or to rock the same with respect to the side bars upon which they are mounted Upon transoms 39 are mounted the brackets 50 adapted to engage upon their inner surfaces with chafe-plates 51 formed upon the bolster, and thus guide the same in a vertical path. Each pair of brackets 50 is connected by a heavy integral brace 52 provided with the depending flanges 53, and with an extension 54 riveted to the adjacent side bar of the truck. In this manner the bolster 47 is firmly tied to the frame of the truck without interfering with its free vertical movement and the use of the full resiliency of the springs. By reason of this bracing, however, any tendency of the bolster to move either in a forward or rearward direction, such as might be occasioned by the sudden stopping or starting of the truck, is positively prevented.

The operation of the above-described embodiment of my invention is substantially as follows: The weight of the car body is transmitted to the transoms 39 as above described, thence through the side bars 8 and pedestals to the several equalizer springs from which it passes to the axle-boxes through the equalizer bars. In this manner a long spring-base is attained, tending to prevent any undue swinging or teetering of the truck, and a mounting of the car is provided of such character as to result in the easiest riding qualities. The entire construction, moreover, is so braced and tied together as to prevent any distortion of the same even under the most trying conditions of use and is peculiarly adapted to resist the stresses incident to its use as a motor truck.

It will thus be seen that I have provided a construction well adapted to accomplish the several objects of my invention and that the weight of the same is reduced to a minimum, all the metal employed being so disposed as to be fully utilized. It will also be seen that by reason of the interlocking construction of the several parts the stresses brought to bear upon the rivets thereof are reduced to a minimum and the reliability of the truck thus increased. The entire construction is well suited for hard, practical employment as a high speed, light weight truck irrespective of the quality of the road-bed or other conditions of use.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

Certain features herein shown and described are shown, described and claimed in my co-pending application, Serial No. 292,447, filed December 19, 1905, and accordingly are not claimed herein.

Having described my invention, what I claim as new, and desire to secure by Letters Patent, is:—

1. In truck construction, in combination, a spring-plank extending across the truck, a transom, and a pair of members connected with said spring-plank, the members of said pair passing respectively each side of said transom and being secured thereto.

2. In truck construction, in combination, a spring-plank extending across the truck, a transom, and a pair of members connected with said spring-plank, the members of said pair passing respectively each side of said transom and being pivotally secured thereto.

3. In truck construction, in combination, a spring-plank, a transom of substantially I cross-section having formed upon the web thereof a pair of registering bosses, a pair of members pivotally secured to said transom, one of the same upon each of said bosses, and a connection between said members and said spring-plank.

4. In truck construction, in combination, a spring-plank, a transom of substantially I cross-section having formed upon the web thereof a pair of registering bosses, a pair of members pivotally secured to said transoms, one of the same upon each of said bosses, and a pivotal connection between said members and said spring-plank.

5. In truck construction, in combination, a pair of transoms, a bolster, springs upon which said bolster is mounted, a spring-plank having mounted thereon the said springs, and two pairs of supporting-members extending from said spring-plank to each of said transoms, the members of each pair passing each side of one transom and being pivotally secured thereto.

6. In truck construction, in combination, a pair of transoms, a bolster, springs upon which said bolster is mounted, a spring-plank having mounted thereon the said springs, and two pairs of supporting-members extending from said spring-plank to each of said transoms, the members of each pair passing each side of one transom and being secured thereto.

7. In truck construction, in combination, a pair of transoms, a bolster, springs upon which said bolster is mounted, a spring-plank having mounted thereon the said springs, and two pairs of supporting-members extending from said spring-plank to each of said transoms, the members of each pair passing each side of one transom and being pivotally secured to said transom and to said spring-plank.

8. In truck construction, in combination, a pair of transoms of substantially I cross-section, two pairs of registering bosses upon opposite sides of the web of each of said transoms, a bolster, springs upon which said bolster is mounted, a spring-plank upon which said springs are mounted, and a hanger pivotally secured to said spring-plank and to said transom upon each of said bosses.

9. In truck construction, in combination, a pair of transoms of substantially I cross-section, two pairs of registering bosses upon opposite sides of the web of each of said transoms, a bolster, springs upon which said bolster is mounted, a spring-plank upon which said springs are mounted, and a hanger pivotally secured to said spring-plank and to said transom upon each of said bosses, said hangers being secured to said bosses by bolts passing therethrough.

10. In truck construction, in combination, a pair of transoms, a bolster mounted between said transoms and above the same, and guiding brackets mounted upon said transoms adapted to co-act with said bolster.

11. In truck construction, in combination, a pair of transoms, a bolster mounted between said transoms, guiding means upon said transoms co-acting with the body portion of said bolster, springs upon which said bolster is mounted, a spring-plank supporting said springs, and two pairs of supporting-members upon said spring-plank, the members of each pair passing each side of the corresponding transom and being secured thereto.

12. In truck construction, in combination, a pair of transoms, a bolster mounted between and extending above the same, guiding brackets mounted upon said transoms and co-acting with said bolster, springs upon which said bolster is mounted, a spring-plank supporting said springs, and two pairs of supporting members pivotally secured to said spring-plank, the members of each pair passing each side of one of said transoms and being pivotally secured thereto.

13. In truck construction, in combination, a pair of side bars, transoms connecting said side bars and projecting above the upper surfaces thereof, and braces secured to said side bars and connected with both of said transoms intermediate said side bars.

14. In truck construction, in combination, a pair of transoms, a bolster mounted between said transoms, and a member connected with one of said side bars and inclined upwardly therefrom to bridge said bolster, said member being secured to both of said transoms.

15. In truck construction, in combination, a pair of transoms, a bolster mounted between said transoms, a member connected with both of said transoms and bridging said bolster, and means connecting said member with the frame of the truck.

16. In truck construction, in combination, a pair of transoms, a bolster between said transoms, a center-plate upon said bolster, a member each side of said center-plate connected with each of said transoms and bridging said bolster, and means connecting said members with the frame of the truck.

17. In truck construction, in combination, a pair of side bars, a pair of transoms connected with said side bars, and a member connected with both of said transoms and inclined outwardly to one of said side bars.

18. In truck construction, in combination, a pair of side bars, a pair of transoms, a bracket upon each of said transoms between said side bars, and a member connecting said brackets and connected with one of said side bars.

19. In truck construction, in combination, a pair of side bars, a pair of transoms, a bracket upon each of said transoms, and a member connecting said brackets and connected with one of said side bars.

20. In truck construction, in combination, a pair of side bars, a pair of transoms bridging said side bars, a bolster between said transoms, and a pair of braces, each of which is rigidly connected with each of said transoms and bridges said bolster and extends outwardly to and is connected with the adjacent side bar.

21. In truck construction, in combination, a pair of transoms, a bolster between said transoms, brackets mounted upon said transoms and adapted to guide said bolster, and a member bridging said bolster and connecting said brackets.

22. In truck construction, in combination, a pair of transoms, a bolster between said transoms, brackets mounted upon said transoms and adapted to guide said bolster, a member bridging said bolster and connecting said brackets, and a connection between said member and the frame of said truck.

23. In truck construction, in combination, a pair of side bars, a pair of transoms, a bolster mounted between said transoms, guiding means upon said transoms co-acting with said bolster, and a brace secured to one of said side bars and bridging said bolster and connected with said transoms.

24. In truck construction, in combination, a pair of transoms, a bolster, springs upon which said bolster is mounted, a spring-plank upon which said springs are mounted, two pairs of supporting-members secured to said spring-plank, the members of each pair passing each side of one of said transoms and being secured thereto, and a member bridging said bolster and connected with said transoms.

25. In truck construction, in combination, a pair of transoms, a bolster, springs upon which said bolster is mounted, a spring-plank upon which said springs are mounted, two pairs of supporting-members secured to said spring-plank, the members of each pair passing each side of one of said transoms and being secured thereto, a member bridging said bolster and connected with said transoms, and means connecting said member with the side frame of the truck.

26. In truck construction, in combination, a spring-plank, a transom, a side bar connected with said transom, a pair of members connected with said spring-plank, one of said members passing each side of said transom and being secured thereto, and a member connected with the upper portion of said transom and having one end thereof connected with said side bar.

27. In truck construction, in combination, a pair of transoms, a bolster mounted between said transoms, means upon said transoms adapted to co-act with and guide said bolster, springs upon which said bolster is mounted, a spring-plank supporting said springs, two pairs of supporting-members secured to said spring-plank extending to each of said transoms, the members of each pair passing each side of or e of said transoms, and means connecting said first-mentioned means and bridging said bolster.

28. In truck construction, in combination, a pair of transoms, a bolster mounted between said transoms, means upon said transoms adapted to co-act with and guide said bolster, springs upon which said bolsters are mounted, a spring-plank supporting said springs, two pairs of supporting-members secured to said spring-plank extending to each of said transoms, the members of each pair passing each side of one of said transoms, and means connecting said first-mentioned means and bridging said bolster, said last-mentioned means being connected with the side frame of the truck.

29. In truck construction, in combination, a pair of side frames, a pair of intersecting oblique members connecting said side frames, and a member stretched directly between said side frames and flanged upwardly upon the outer side thereof.

30. In truck construction, in combination, a pedestal adapted to pass each side of an axle-box, members resting upon said axle-box at each side of said pedestal, and springs interposed between said members and said pedestal.

31. In truck construction, in combination, a pedestal adapted to pass each side of an axle-box, a pair of members adapted to rest on said axle-box at each side of said pedestal, a spring-seat mounted between said members at each end thereof, and springs interposed between said spring-seats and said pedestal.

32. In truck construction, in combination, a pedestal adapted to pass each side of an axle-box, a pair of members adapted to rest on said axle-box at each side of said pedestal, a spring-seat mounted between said members at each end thereof, springs interposed between said spring-seats and said pedestal, and a side bar secured within a recess formed in said pedestal.

33. In truck construction, in combination, a pedestal adapted to pass each side of an axle-box, extensions upon said pedestal extending away from said axle-box, a pair of members adapted to rest upon said axle-box at each side of said pedestal and extending beneath said extensions, and springs interposed between said members and said extensions upon said pedestal.

34. In truck construction, in combination, a pedestal adapted to pass each side of an axle-box, extensions upon said pedestal extending away from said axle-box, a pair of members adapted to rest upon said axle-box at each side of said pedestal and extending beneath said extensions, springs interposed between said members and said extensions upon said pedestal, a similar pedestal upon the opposite side of the truck, and a cross-bar stretched between and connecting said pedestals.

35. In truck construction, in combination, a pair of pedestals adapted to pass each side of axle-boxes, each of said pedestals being provided with an extension, a cross-bar connecting said extensions, means provided with springs interposed between each of said extensions and the corresponding axle-box, and a member connecting one of said extensions with the lower portion of the corresponding pedestal.

36. In truck construction, in combination, a pedestal adapted to pass each side of an axle-box, extensions formed upon said pedestal adapted to extend away from said axle-box, means provided with springs interposed between each of said extensions and said axle-box, and a brace connecting one of said extensions with the lower portion of the pedestal.

37. In truck construction, in combination, a pedestal upon each side of a truck provided with an extension, a cross-bar connecting said extensions, and a brace connecting each of said extensions with the lower portion of the corresponding pedestal.

38. In truck construction, in combination, a pedestal upon each side of the truck, each of said pedestals being provided with an extension, a cross-bar of substantially I cross-section connecting said extensions, and a pair of braces secured respectively to the inner and outer sides of the web of said cross-bar at each end thereof and passing downwardly and secured to the inner and outer sides of the corresponding pedestal.

39. In truck construction, in combination, a pair of side frames, transoms mounted upon said side frames, a bolster between said transoms, springs upon which said bolster is mounted, a spring-plank supporting said springs, two pairs of supporting members from said spring-plank to each of said transoms, the members of each pair passing each side of and being secured to one of said transoms, and oblique intersecting braces connecting said side frames.

40. In truck construction, in combination, a pair of side frames, a pair of transoms mounted thereon, a bolster between said transoms, guiding means on said transoms co-acting with the body portion of said bolster, and oblique intersecting braces connecting said side frames.

41. In truck construction, in combination, a pair of side frames, a pair of transoms mounted thereon, a bolster mounted between said transoms, guiding means upon said transoms co-acting with said bolster, springs upon which said bolster is mounted, a spring-plank supporting said springs, two pairs of supporting members connected with said spring-plank and extending to each transom, the members of each pair passing each side of one of said transoms and being secured thereto, and a pair of intersecting oblique braces connecting said side frames.

42. In truck construction, in combination, a pair of side bars, a pair of oblique intersecting braces connecting said side bars, a pair of pedestals respectively secured to said side bars, and an end bar connecting said pedestals.

43. In truck construction, in combination, a pair of side bars, a pair of oblique intersecting braces connecting said bars, a pair of pedestals respectively connected with said side bars, an axle-box within each of said pedestals, means comprising a spring interposed between each axle-box and the corresponding pedestal, each of said pedestals being provided with an extension, and braces connecting each of said extensions with the lower portion of the corresponding pedestal.

44. In truck construction, in combination, a pair of side bars, a pair of oblique intersecting braces connecting said bars, a pair of pedestals respectively connected with said side bars, an axle-box within each of said pedestals, means comprising a spring interposed between each axle-box and the corresponding pedestal, each of said pedestals being provided with an extension, braces connecting each of said extensions with the lower portion of the corresponding pedestal, and an end bar connecting said extensions one with another.

45. In truck construction, in combination, a pair of side frames each comprising a side bar and a pedestal, a pair of oblique intersecting braces connecting said side frames one with another, each of said pedestals having an upper extended portion, and a member connecting each of said extended portions with the lower portion of the corresponding pedestal.

46. In truck construction, in combination, a pair of side frames each comprising a side bar and a pedestal, a pair of oblique intersecting braces connecting said side frames one with another, each of said pedestals having an upper extended portion, a member connecting each of said extended portions with the lower portion of the corresponding pedestal, and an end bar connecting said extended portions.

47. In truck construction, in combination, a pair of side-bars, a pair of oblique intersecting braces connected with said side-bars, a pedestal connected with said side-bars, an axle-box within each of said pedestals, means comprising a spring interposed between each axle-box and the corresponding pedestal, each of said pedestals being provided with an extension, and a cross-member connecting said extensions.

48. In truck construction, in combination, a pair of side-frames each comprising a side-bar and a pedestal, a pair of oblique intersecting braces connecting said side-frames one with another, each of said pedestals having an extension, and an end bar connecting said extensions.

49. In truck construction, in combination, a pair of side-frames, a pair of transoms mounted thereon and extending above said side frames, a bolster mounted between said transoms, a member connected with both of said transoms and bridging said bolster, and a pair of oblique intersecting braces connecting said side-frames one with another.

50. In truck construction, in combination, a pair of side-frames, a pair of transoms mounted thereon, a bolster mounted between said transoms, a member connected with both of said transoms and bridging said bolster, means connecting said member with the frame of the truck, and a pair of oblique intersecting braces connecting said side-frames one with another.

51. In truck construction, in combination, a pair of side-frames, a pair of transoms mounted thereon, a bolster mounted between said transoms, a member connected with both of said transoms and bridging said bolster, means connecting said member with the frame of the truck, a pair of oblique intersecting braces connecting said side-frames one with another, and guiding means upon said transoms co-acting with said bolster.

52. In truck construction, in combination, a pair of side-frames, a pair of transoms mounted thereon, a bolster between said transoms, springs upon which said bolster is mounted, a spring-plank having mounted thereon said springs, four pairs of supporting members extending from said spring-plank to each of said transoms, the members of each pair passing each side of one transom and being secured thereto, a member connected with both of said transoms and bridging said bolster, means connecting said member with the frame of the truck, and a pair of oblique intersecting braces connecting said side-frames one with another.

53. In truck construction, in combination, a pair of side-frames, a pair of transoms mounted thereon, a bolster between said transoms, springs upon which said bolster is mounted, a spring-plank having mounted thereon said springs, four pairs of supporting members extending from said spring-plank two pairs of which are connected with each of said transoms, the members of each pair passing each side of one transom and being secured thereto, a member connected with both of said transoms and bridging said bolster, and a pair of oblique intersecting braces connecting said side-frames one with another, said transoms being provided with guiding means co-acting with said bolster.

54. In truck construction, in combination, a pair of side-frames each including a pedestal, a pair of transoms mounted upon said side-frames, a bolster between said transoms, a member connected with both of said transoms and bridging said bolster, means connecting said member with the frame of the truck, and an end bar connecting said pedestals one with another.

55. In truck construction, in combination, a pair of side-frames each including a pedestal, a pair of transoms mounted upon said side-frames, a bolster between said transoms, a member connected with both of said transoms and bridging said bolster, means connecting said member with the frame of the truck, and an end bar connecting said pedestals one with another, said transoms being provided with guiding means co-acting with said bolster.

56. In truck construction, in combination, a pair of side-frames each comprising a pedestal, a pair of transoms mounted thereon, a bolster, springs upon which said bolster is mounted, a spring-plank having mounted thereon the said springs, four pairs of supporting members extending from said spring-plank two pairs of which are connected with each of said transoms, the members of each pair passing each side of one transom and being secured thereto, a member connected with both of said transoms and bridging said bolster, and an end bar connecting said pedestals one with another.

57. In truck construction, in combination, a pair of side-frames each comprising a pedestal, a pair of transoms mounted upon said side-frames, a bolster mounted between said transoms, a member connected with both of said transoms and bridging said bolster, means connecting said member with the frame of the truck, an end bar connecting said pedestals one with another, and a pair of oblique intersecting braces connecting said side-frames one with another.

58. In truck construction, in combination, a pair of side-frames each comprising a pedestal, a pair of transoms mounted upon said side-frames, a bolster mounted between said transoms, a member connected with both of said transoms and bridging said bolster, an end bar connecting said pedestals one with another, and a pair of oblique intersecting braces connecting said side-frames one with another.

59. In truck construction, in combination, a pair of side-frames each comprising a pedestal, a pair of transoms mounted upon said side-frames, a bolster mounted between said transoms, a member connected with both of said transoms and bridging said bolster, an end bar connecting said pedestals one with another, and a pair of oblique intersecting braces connecting said side-frames one with another, said transoms being provided with guiding means co-acting with said bolster.

60. In truck construction, in combination, a pair of side-frames, a pair of transoms mounted thereon, a bolster, springs upon which said bolster is mounted, a spring-plank having mounted thereon said springs, four pairs of supporting members extending from said spring-plank two pairs of which are connected with each of said transoms, the members of each pair passing each side of one of the transoms and being secured thereto, a member connected with both of the transoms and bridging said bolster, means connecting said member with the frame of the truck, and a pair of oblique intersecting braces connecting said side-frames one with another.

61. In truck construction, in combination, a pair of side-frames, a pair of transoms mounted thereon, a bolster, springs upon which said bolster is mounted, a spring-plank having mounted thereon said springs, four pairs of supporting members extending from said spring-plank two pairs of which are connected with each of said transoms, the members of each pair passing each side of one of the transoms and being secured thereto, a member connected with both of the transoms and bridging said bolster, and a pair of oblique intersecting braces connecting said side-frames one with another.

In testimony whereof I affix my signature, in the presence of two witnesses.

WILLIAM R. McKEEN, Jr.

Witnesses:
ARTHUR H. FETTERS,
JAMES G. HOPE.